April 16, 1940.   H. SAUER ET AL   2,197,194
PHOTOGRAPHIC CAMERA
Original Filed Feb. 2, 1938    2 Sheets-Sheet 1
Fig.1
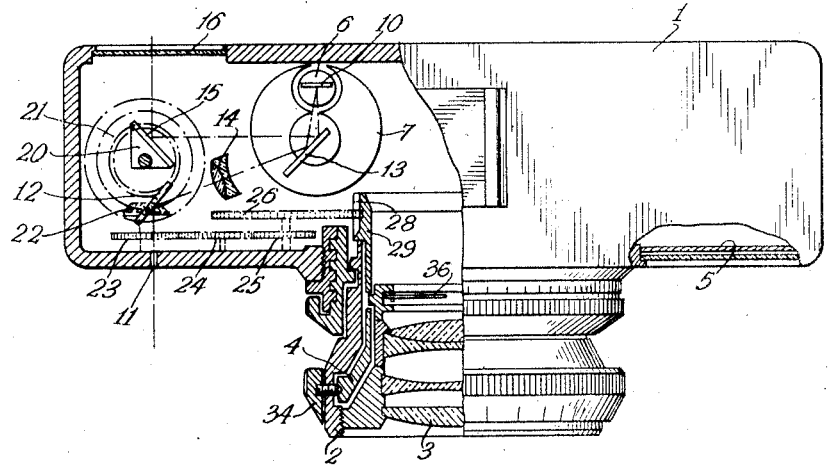
Fig.2
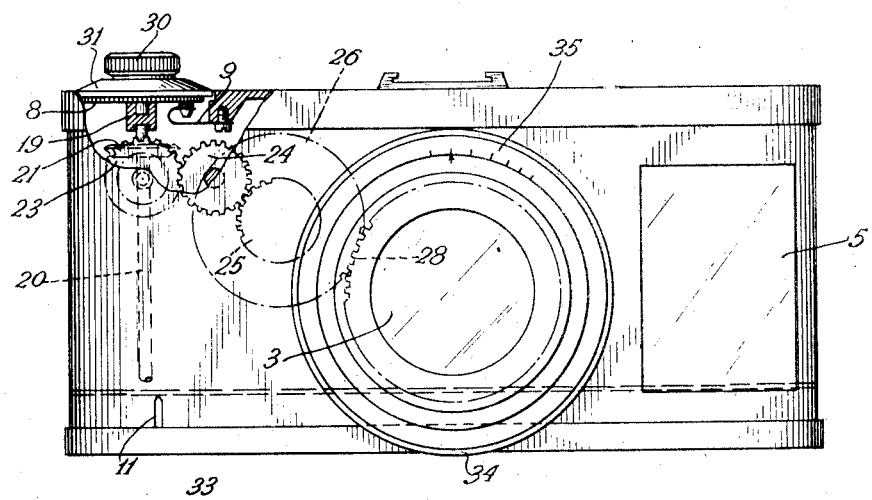
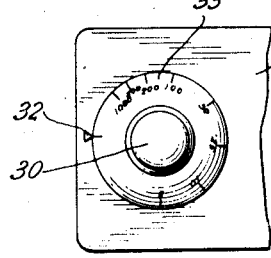
Fig.3
Inventors:
Hans Sauer
Paul Görlich
By
Singer, Ehlert, Stern & Carlberg
Attorneys April 16, 1940.   H. SAUER ET AL   2,197,194
PHOTOGRAPHIC CAMERA
Original Filed Feb. 2, 1938   2 Sheets-Sheet 2

Inventors:
Hans Sauer
Paul Görlich
By: Singer, Ehlert, Stern & Carlberg
Attorneys Patented Apr. 16, 1940

2,197,194

UNITED STATES PATENT OFFICE 2,197,194

PHOTOGRAPHIC CAMERA

Hans Sauer and Paul Görlich, Dresden, Germany, assignors to Zeiss Ikon Aktiengesellschaft, Dresden, Germany Original application February 2, 1938, Serial No. 188,374. Divided and this application September 22, 1939, Serial No. 296,020. In Germany January 13, 1937

7 Claims. (Cl. 95—10)

This invention is a division of our application for Letters Patent filed in the United States Patent Office on the 2nd day of February 1938, Serial No. 188,374 relating to improvements in exposure meters, and particularly to improvements in exposure meters permanently combined with photographic cameras.

It is an object of the invention to increase the sensitiveness of the meter by utilization of a reflecting galvanometer as a part of the exposure meter.

It is furthermore an object of the invention to facilitate the reading of the indicating beam by lengthening the path of the indicating beam between the movable mirror of the galvanometer and the translucent screen on which the position of the indicator beam can be observed.

It is furthermore an object of the invention to reduce the volume of the instrument by deflecting the path of light between the point of entry in the instrument and the movable mirror of the galvanometer, whereby the galvanometer mirror may be positioned out of line with the inlet opening for the light, and whereby an optical element for focusing the light may be inserted between the inlet opening and the mirror of the galvanometer.

It is furthermore an object of the invention to render beam deflecting means adjustable in order to cause the beam to appear on a predetermined point of a translucent screen on which it is to be observed, and to combine the adjustable deflecting means with means for controlling the exposure.

It may, therefore, also be described as an object of the invention to combine a beam regulating means with an exposure control means of the camera, whereby upon the appearance of the beam at a predetermined point of the translucent screen, indication is furnished that the control means for the exposure has been adjusted to the desired position.

With these and numerous other objects in view, an embodiment of the invention has been described by way of example in the following specification and shown in the accompanying drawings to which reference is made in the specification.

In the drawings:

Fig. 1 is partly a top plan view and partly a horizontal section through a camera combined with an exposure meter and mirror galvanometer;

Fig. 2 is a front elevation of the camera and exposure meter, certain parts being shown in section;

Fig. 3 is a top plan view of a detail of the adjusting means;

Figure 4:
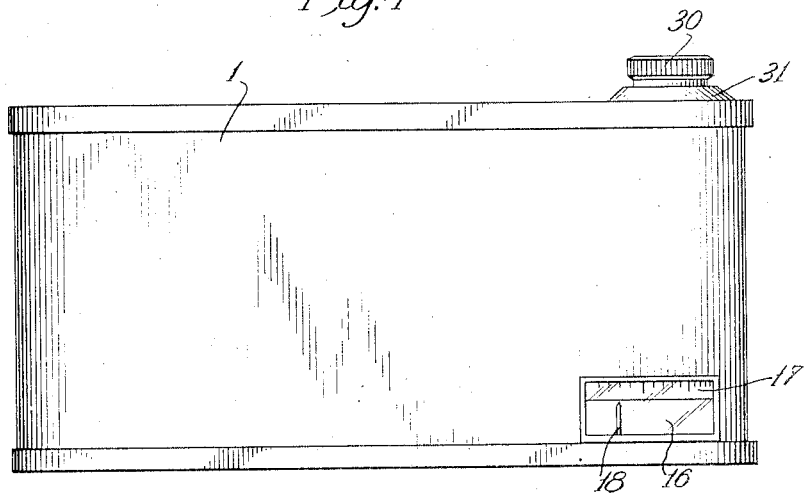
Fig. 4 is a rear elevation of the camera with the observation window for the indicator beam.
Figure 5:
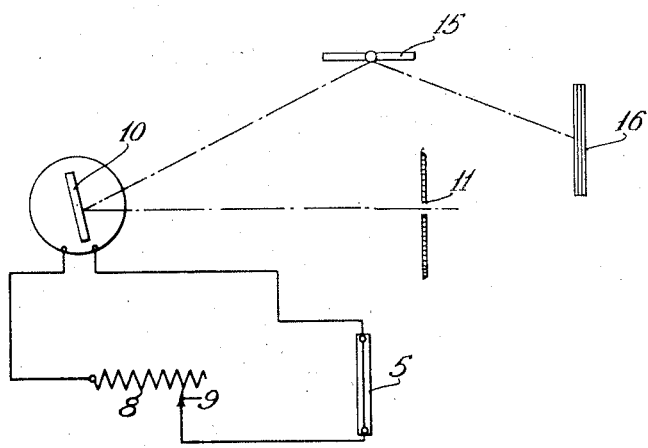
Fig. 5 is a simplified diagrammatical representation of the exposure meter and the optical equipment.

In the embodiment illustrated by way of example, the exposure meter is shown as being combined with the housing 1 of a camera. The latter has a mounting 2 preferably detachable, for a suitable lens 3, and is also provided with exposure control means, as for instance, a diaphragm ring 4 through which the effective aperture of the lens 3 may be varied as demanded by the light conditions and other conditions for the exposure. The diaphragm itself is shown in the drawings at 36.

The means for focal adjustment of the lens 3 may be constructed in any desired way and do not form any part of the present invention. Similarly also, the construction of the diaphragm may be selected as desired, and no claim is made to the specific construction of these parts.

The exposure meter illustrated by way of example also is of the known current generating type in which the light striking a photosensitive cell energizes said cell to produce an electric current, the intensity of which depends upon the strength of illumination. The intensity of this current may be determined by a galvanometer within the circuit. Devices of this type are now generally known and are frequently employed either in fixed association with the camera itself or detached from the camera.

In the embodiment illustrated, the front wall of the camera has an opening in which the photosensitive cell 5 is located. The electric current generated upon illumination of the cell is carried through conductors, not shown, to the movable system of a galvanometer 6, the stationary part of which is formed by the magnet 7. A variable resistance 8, Fig. 2, may be interposed between the source of current 5 and the measuring instrument 6, and as in similar devices of this character, the variation of the resistance is effected by supporting the same movably relatively to a stationary contact member 9 in the circuit.

While in photographic exposure meters the movable system 6 of the galvanometer generally causes a pointer to move relatively to a scale, in the present invention the sensitiveness of the instrument is greatly enhanced by converting this galvanometer into a mirror galvanometer, and by providing a longer path for the beam of light reflected by the mirror than it normally would be in an instrument as compact and compendious as instruments of this character necessarily have to be.

For this purpose the indicating beam of light reflected from the mirror of the galvanometer is reflected, preferably a plurality of times, between the mirror 10 and the translucent observation window, so that this path is considerably longer than the actual distance between the mirror 10 and the translucent screen.

The front wall of the housing 1 is provided with a small or narrow slit 11 shown near the bottom and through which the light enters to strike a reflector 12 preferably in a fixed position in the interior of the housing. The light reflected by the mirror 12 is thrown upon another mirror or reflector 13 to be reflected thereby upon the galvanometer mirror 10.

For the purpose of producing a very sharp picture of the beam of light entering the slit 11 in the housing, means for condensing said beam may be provided between the point of entry and the movable reflector 10 of the galvanometer. By way of example a compound lens 14 adapted to produce a very sharp picture of the beam of light is shown interposed between the reflectors 12 and 13 in the embodiment illustrated. Owing to this multiple deflection, the location of the mirror 10 also need not be in alinement with the slit 11, so as to make the instrument very compact and narrow, without sacrificing the sensitiveness due to the mirror galvanometer.

The beam of light reflected by the mirror 10 is not projected directly upon the translucent screen, but its path also is lengthened to produce a broad sweep over said screen. In the embodiment shown, the beam reflected from mirror 10 is directed toward the reflector 13 although it is obvious that in place of this reflector which had been used for the incident beam of light, another reflector might be positioned in the path of the reflected beam. The light is then reflected from mirror 13 to a reflector 15, from which last named reflecting means it is projected upon the translucent screen 16. This screen is preferably disposed in the rear wall of the camera, and as shown in Fig. 4, a plurality of markings 17 are provided thereon permitting the observer to read the position of the indicator beam 18 with respect to any of these indications.

One of the deflecting means is coupled with one of the elements for controlling the exposure condition.

In the embodiment illustrated, the reflector 15 is mounted on a shaft 20, which is rotatable in the housing. The upper end of shaft 20 enters the bearing stud 19, which may be fixed in the housing. A bevel gear 21 on shaft 20 is in operative relation to the bevel gear 22, with which a train of spur gears 23, 24 and 25 is associated, the last named gear being fixedly connected with another gear 26 in mesh with the gear rim 28 on the ring 29, and this last named ring is connected with the diaphragm 4 of the camera.

The adjustment of the resistance 8 is effected by turning a knob 30 which is accessible from the outside of the housing and which has a bevelled base 31 adapted to be set selectively with respect to a fixed mark 32 also disposed on the housing. The bevelled disc 31 preferably carries indications of the shutter speed, and by rotation of the knob 30, therefore, the shutter may be set to the speed indicated for which purpose a mechanism, not illustrated herein, but well known by itself, may be used.

In the use of the device, the operator advisably selects through rotation of the knob 30 the exposure time which may depend upon the nature of the object, whether movable or stationary, and which also may be selected under consideration of the light conditions as estimated by the operator. Rotation of the knob 30 not only adjusts the shutter to the desired speed, but also determines the value of the resistance 8 within the circuit of the galvanometer and photoelectric cell. If then the photoelectric cell 5 is exposed to the light reflected by the object, the current set up in the circuit of this cell will bring about a deflection of the movable system of the galvanometer, depending on the one hand upon the light condition, and on the other hand upon the resistance 8. The current imparts movement to the mirror 10, so that the beam 18 travels over the screen 16 at the rear face of the camera. This rear face is directed towards the operator, and hence the location of the beam is continuously under observation of the user. The translucent screen 16 has markings 17 which may indicate the stop to be used at the selected shutter speed. It is also feasible, however, to turn now the ring 34 which is connected with the diaphragm ring 4 and has a diaphragm aperture scale 35 thereon, in order to actuate the train of gears 28 to 21 inclusive, whereby a rotary movement of the adjustable reflector 15 is set up, thereby influencing the position of the beam on the face of the transparent screen.

This adjustment, preferably, is continued until the beam 18 reaches a predetermined position, as for instance, a zero or central position upon the screen. When this condition has been attained, the operator has selected the proper diaphragm for the speed which previously had been selected.

The invention, however, is not intended to be limited to the embodiment described and shown. It is possible for instance to effect positive setting of the second adjustable exposure control element, namely the diaphragm or stop, when the first exposure control element, namely the shutter, is set to a certain speed value. This could be accomplished by returning the indicator beam to a predetermined position, as for instance zero position, by turning a reflector. It could also be accomplished by having a second beam, or other indicator means, in lagging or leading cooperation with the indicator beam.

We claim:

1. In a photographic camera united with a photoelectric exposure meter, the combination of a camera casing having a front wall and a rear wall, a photoelectric cell mounted on said front wall, a translucent screen in said rear wall, a mirror galvanometer within said camera casing and adapted to be operated by the current released by the photoelectric cell, means for projecting a beam of light upon the movable mirror of the galvanometer, adjustable light deflecting means interposed between said movable mirror and said translucent screen, manually operable means for controlling the exposure of a film placed in the camera, and means for operatively coupling said adjustable deflecting means with said exposure control means, whereby the proper adjustment of the exposure control means is indicated by the appearance of the beam of light on a selectively determined position of the translucent screen.

2. In a photographic camera the combination with a photoelectric exposure meter, of a camera casing having a front wall and a rear wall, a photoelectric cell on said front wall, a mirror galvanometer within said camera casing, a variable resistance in the circuit of said exposure meter, the front wall of said camera casing having a slit-shaped opening through which light may pass to the movable mirror of said galvanometer, two exposure controlling elements forming parts of the camera, a translucent screen in the rear wall of said camera casing, means for deflecting the light reflected from said movable mirror upon said translucent screen, said deflecting means being adjustable and being coupled with one of said two exposure controlling elements of the camera, whereby upon actuating said exposure controlling element the deflecting means is adjusted at the same time, and means operatively connecting the other exposure controlling element of the camera with said variable resistance for adjusting the beam of light to a predetermined point of said translucent screen after said first named exposure controlling element has been adjusted.

3. A photographic camera comprising in combination with a photoelectric exposure meter, a camera casing having a front wall and a rear wall, a photoelectric cell on said front wall, a mirror galvanometer within said camera casing and adapted to be actuated by the current released by the photoelectric cell, the front wall of the camera casing having a slit-shaped opening through which light may pass to the movable mirror of the galvanometer, a translucent screen in the rear wall of the camera casing, adjustable means for deflecting the beam of light reflected by said movable mirror upon said translucent screen, a photographic objective having a manually adjustable diaphragm on said front wall of the camera casing, means for operatively connecting said adjustable diaphragm with said adjustable means which deflects the beam of light reflected by said movable mirror of the galvanometer, a shutter speed setting member, means for varying the current in the circuit of said exposure meter, and means operatively connecting said shutter speed setting member with said current varying means, whereby after a previous adjustment of the diaphragm the beam of light by actuating the shutter speed setting member may be adjusted to appear at a predetermined point of said translucent screen, which indicates a correct adjustment of the diaphragm and shutter for the prevailing light condition.

4. In a photographic camera, the combination of a photoelectric exposure meter, a camera casing having a top wall, a front wall and a rear wall, a photographic objective on said front wall, said photoelectric exposure meter including within a circuit a photoelectric cell mounted on said front wall, a variable resistance and a mirror galvanometer within said camera casing, the front wall of said camera casing being provided with a slit, a translucent screen in said rear wall of said camera casing, two reflecting members within said camera casing for reflecting the beam of light entering said camera casing through said slit onto the movable mirror of said mirror galvanometer, one of said reflecting members being positioned to reflect the beam of light a second time after said beam of light has been reflected by said movable mirror, a third reflecting member within said camera casing for receiving the beam of light reflected from said movable mirror onto said last named reflecting member to reflect this beam onto said translucent screen, a manually operable shutter speed adjusting member on said top wall and operatively connected with said variable resistance for varying the same whenever said shutter speed adjusting member is operated.

5. In a photographic camera, the combination of a photoelectric exposure meter, a camera casing having a top wall, a front wall and a rear wall, a photographic objective on said front wall and provided with an adjustable diaphragm and a manually rotatable diaphragm adjusting ring, said photoelectric exposure meter including within a circuit a photoelectric cell mounted on said front wall, a variable resistance and a mirror galvanometer within said camera casing, the front wall of said camera casing being provided with a slit, a translucent screen in said rear wall of said camera casing, two reflecting members within said camera casing for reflecting the beam of light entering said camera casing through said slit onto the movable mirror of said mirror galvanometer, one of said reflecting members being positioned to reflect the beam of light a second time after said beam of light has been reflected by said movable mirror, a third reflecting member within said camera casing for receiving the beam of light reflected from said movable mirror onto said last named reflecting member to reflect this beam onto said translucent screen, and a manually operable shutter speed adjusting member on said top wall and operatively connected with said variable resistance for varying the same whenever said shutter speed adjusting member is operated, and means operatively connecting said diaphragm adjusting ring with said third reflecting member for adjusting the latter whenever the diaphragm adjusting ring is operated.

6. In a photographic camera, the combination of a photoelectric exposure meter, a camera casing having a front wall and a rear wall, a photographic objective with a variable diaphragm on said front wall, said exposure meter including within a circuit a photoeectric cell mounted on said front wall adjacent said objective, a variable resistance and a mirror galvanometer within said camera casing, the front wall of said camera casing being provided with a slit, a translucent screen in said rear wall of said camera casing, two reflecting members within said camera casing for reflecting the beam of light entering said camera casing through said slit onto the movable mirror of said mirror galvanometer, one of said reflecting members being positioned to reflect the beam of light a second time after said beam of light has been reflected by said movable mirror, a third reflecting member within said camera casing for receiving the beam of light reflected from said movable mirror onto said last named reflecting member to reflect this beam onto said translucent screen, and a manually operable shutter speed adjusting member operatively connected with said variable resistance for varying the latter whenever said shutter speed adjusting member is operated, said translucent screen being provided with a diaphragm aperture scale.

7. In a photographic camera, the combination of a photoelectric exposure meter, a camera casing having a front wall and a rear wall, a photographic objective with a variable diaphragm on said front wall, said exposure meter including within a circuit a photoelectric cell mounted on said front wall adjacent said objective, a variable resistance and a mirror galvanometer within said camera casing, the front wall of said camera casing being provided with a slit, a translucent screen in said rear wall of said camera casing, two reflecting members within said camera casing for reflecting the beam of light entering said camera casing through said slit onto the movable mirror of said mirror galvanometer, one of said reflecting members being positioned to reflect the beam of light a second time after said beam of light has been reflected by said movable mirror, a third reflecting member within said camera casing for receiving the beam of light reflected from said movable mirror onto said last named reflecting member to reflect this beam onto said translucent screen, a manually operable shutter speed adjusting member operatively connected with said variable resistance for varying the latter whenever said shutter speed adjusting member is operated, and means operatively connecting the variable diaphragm of said photographic objective with said third reflecting member for adjusting the latter whenever the diaphragm is adjusted to another aperture.

HANS SAUER.
PAUL GÖRLICH.